United States Patent [19]

Onada et al.

[11] 4,032,620

[45] June 28, 1977

[54] PROCESS FOR PREPARING DICYAN

[75] Inventors: Takeru Onada, Yokohama; Shinpei Tomita, Komae, both of Japan

[73] Assignee: Mitsubishi Chemical Industries Ltd., Tokyo, Japan

[22] Filed: Jan. 13, 1977

[21] Appl. No.: 758,994

Related U.S. Application Data

[63] Continuation-in-part of Ser. No. 594,655, July 10, 1975, abandoned.

[30] Foreign Application Priority Data

July 18, 1974 Japan .............................. 49-82411

[52] U.S. Cl. .............................................. 423/384
[51] Int. Cl.$^2$ ........................................ C01C 3/00
[58] Field of Search .................. 423/364, 368, 384

[56] References Cited

UNITED STATES PATENTS

| | | | |
|---|---|---|---|
| 3,031,265 | 4/1962 | Zima .................................. | 423/384 |
| 3,032,582 | 5/1962 | Zima .............................. | 423/384 X |
| 3,239,309 | 3/1966 | Zima et al. ........................ | 423/384 |

*Primary Examiner*—Earl C. Thomas
*Attorney, Agent, or Firm*—Jordan B. Bierman; Linda G. Bierman

[57] ABSTRACT

A process for preparing dicyan characterized by reacting prussic acid and molecular oxygen in the gaseous phase at 150°–650° C in the presence of a solid catalyst comprising palladium and at least one of tellurium and antimony.

8 Claims, No Drawings

PROCESS FOR PREPARING DICYAN

This application is a continuation-in-part of Ser. No. 594,655, filed July 10, 1975. and now abandoned which in turn claims the priority of Japanese Application No. 82411/74, filed July 18, 1974.

BACKGROUND OF THE INVENTION

1. Field of the Invention

The present invention relates to a process for preparing dicyan from prussic acid and oxygen according to the following formula:

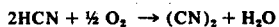

$$2HCN + \tfrac{1}{2} O_2 \rightarrow (CN)_2 + H_2O$$

Oxamide, oxalic acid and the like can be prepared by hydrolysis of dicyan. Besides dicyan is useful as a raw material for synthesizing nitrogen-containing compounds having various physiological activities and, therefore, an inexpensive synthetic process thereof is expected to be developed.

Prussic acid is most convenient as a raw material for dicyan, and, at the present time the supply of prussic acid on a large scale is possible by an increase of the production of acrylonitrile by ammoxidation of propylene, the development of an industrial process for preparing dicyan from prussic acid meets the above described expectations.

2. Description of the Prior Art

As a process for preparing dicyan from prussic acid, a method of dehydrogenating prussic acid, a method of using a nitrogen oxide as an oxidizing agent, a method of using chlorine as an oxidizing agent, and a method of partially oxidizing prussic acid with oxygen, and the like have hitherto been known. Among them, in the method of partial oxidation of prussic acid with oxygen, when silver (BP No. 932,520) or platinum-palladium alloy (U.S. Pat. No. 3,239,309) is used as a catalyst and oxygen is used in an amount of below stoichiometric amount necessary for oxidation of prussic acid to dicyan, the selectivity for dicyan is excellent as 70 to 90% although the conversion of prussic acid is low. However, the method of using those catalysts has such a defect that an elevated reaction temperature is required.

In addition there are methods of using a simple substance of gold (German Pat. No. 1,056,101) or silver (U.S. Pat. No. 2,712,493) or an oxide or hydroxide of lithium, magnesium, molybdenum, manganese, nickel or silver (U.S. Pat. No. 3,065,057), as a catalyst and using oxygen as an oxidizing agent, these methods are low in yield of dicyan since the reaction condition is severe and cyanic acid (HOCN) is produced as a by-product.

SUMMARY OF THE INVENTION

As a result of studying a catalyst on the preparation of dicyan by partial oxidation of prussic acid using oxygen as an oxidizing agent, the present inventors have found that a catalyst essentially comprising palladium and at least one member selected from antimony and tellurium is very high in activity and selectivity and gives dicyan at a temperature far lower than that in the conventional method, and have accomplished the present invention.

Prussic acid and oxygen used as a raw material in the present invention are not necessary to be pure but may contain an inert gas such as nitrogen and carbon dioxide.

The preparation of dicyan according to the present invention is conducted in gaseous phase in the presence of a solid catalyst containing palladium and at least one of antimony and tellurium.

DETAILED DESCRIPTION OF THE PREFERRED EMBODIMENT

The reaction of prussic acid and oxygen to dicyan scarcely proceeds in the presence of a catalyst comprising only palladium as an active component, however, when at least one member selected from the group consisting of antimony and tellurium coexists with palladium, the reaction velocity rises remarkably. Although the effective state of catalyst is not understood in detail, it is considered that those components are mainly in a state of metal or oxide and at least one part of palladium forms an alloy with antimony, tellurium, and the like. Therefore, they are preferably kept in such state before the reaction, they may be in a state of compound convertible to such state under the reaction condition, for example a halide such as a chloride, an inorganic acid salt such as a nitrate and an organic acid salt such as an acetate.

Conventional methods for preparation of metal catalyst supported on carrier, for example impregnation method, coprecipitation method, etc. are used for the preparation of the catalyst. For example, a matter prepared by dissolving a palladium compound and at least one compound selected from tellurium and antimony compounds in a solvent, impregnating a carrier with the solution so obtained and drying the carrier can be used as a catalyst. However, the catalyst is preferably reduced before contact with gas containing prussic acid and oxygen. The reduction is carried out usually in a stream of hydrogen or gaseous organic reducing agent, or in the liquid state using a well known reducing agent such as hydrazine, formalin, etc.

In case antimony is deposited on the carrier, it is particularly preferable to oxidize the antimony on the carrier with a molecular oxygen containing gas to antimony oxide. Palladium and antimony or tellurium may be deposited on the carrier at the same time as described above or in turn.

As a palladium compound used for preparation of the catalyst, a halide such as palladium chloride, an organic acid salt such as palladium acetate, an inorganic acid salt such as palladium nitrate, and the like are usually employed. The concentration of palladium on carrier is preferably within the range of 0.1 to 20%, by weight, although the reaction proceeds in the concentration of less than 0.1%, by weight, and the reaction is possible to be carried out in the concentration of more than 20%, by weight. As tellurium and antimony compounds used for preparation of the catalyst, a halide such as a chloride, an inorganic salt such as a nitrate, an organic salt such as an oxalate, a metallic oxide and the like are usually employed.

The amount of antimony or tellurium deposited on the carrier is preferably within the range of 0.05 to 30%, by weight, calculated as metal although it is effective in broader range. The ratio of antimony to palladium in the catalyst is desirably 0.05 to 30 more preferably 0.05 to 5 in atomic ratio. And the ratio of tellurium to palladium in the catalyst is desirably 0.01 to 10, more preferably 0.05 to 1 in atomic ratio.

As a carrier used for preparation of the catalyst any conventional carrier, such as silica, silica-alumina, alumina, clay, pumice, magnesia, diatomaceous earth, active carbon, etc, can be used.

The reaction of prussic acid and molecular oxygen in the present invention is carried out in gaseous phase. And the reaction can be carried out in any type of fixed bed, fluidized bed, etc. The molecular oxygen containing gas is not necessary to be pure oxygen but may be diluted with an inert gas such as nitrogen, carbon dioxide, etc.

The ratio of prussic acid to oxygen in the feed gas may be widely varied although, in order to prevent prussic acid from complete oxidation and to proceed the reaction advantageously, the amount of oxygen to prussic acid is preferably about 0.5 to 6 times the stoichiometric quantity. When the ratio of oxygen is low, the conversion has a tendency to be lowered although the selectivity to dicyan is improved. The mixed gas of prussic acid and oxygen is preferably diluted with an inert gas so that the composition is out of the explosion limit because the mixed gas is explosive.

The reaction is carried out usually at 150° to 650° C, however, on considering the reaction velocity and the production of carbon dioxide owing to complete oxidation, it is preferably run at 200° to 400° C. The reaction pressure is generally ordinary pressure to several tens atmospheric pressure although it is optional.

The present invention will be further illustrated with the following Examples:

EXAMPLES 1 to 4

Preparation of Catalyst 20 ml of silica (16 to 30 meshes; trade name:Nikki Silica N-608) were immersed in a hydrochloric acid solution having dissolved palladium chloride dihydrate (3.2 milimoles) and tellurium oxide (1.6 milimole) and resulted slurry was evaporated to dryness in an evaporator followed by drying with a nitrogen stream at 180° to 200° C. The dried product was reduced in a hydrogen stream at 180° to 200° C for 1 hour and further in a hydrogen stream at 400° C for 2 hours to obtain a catalyst.

The amount of palladium chloride supported was 4%, by weight, per carrier, calculated as palladium metal. The atomic ratio of tellurium to palladium was 0.5.

Catalysts in which the amount of palladium supported is 4%, by weight, and the atomic ratio of tellurium to palladium is 0.15, 0.3 and 0.8, respectively, were prepared in the same manner. These catalysts are considered to be such that palladium and tellurium are in metallic state and at least one part of them is alloyed.

Reaction 20 ml of paladium-tellurium catalyst so prepared were filled up in a reaction tube made of pyrex glass and kept at 260° C, and a mixed gas of prussic acid, oxygen and nitrogen was introduced thereinto in a volume ratio 5:6.5:155 and in space velocity of 500 hr$^{-1}$. The reaction results 30 minutes after the reaction was started were as shown in Table 1. As a product using prussic acid as a carbon source only dicyan and carbon dioxide were obtained.

Table 1

| No. | Ratio of tellurium to palladium in catalyst | Conversion of prussic acid (%) | Selectivity to dicyan (%) |
|---|---|---|---|
| 1 | 0.15 | 12.4 | 66 |
| 2 | 0.3 | 36.8 | 69 |
| 3 | 0.5 | 100 | 82 |
| 4 | 0.8 | 43.2 | 72 |

EXAMPLE 5

A tellurium-palladium catalyst of 0.5 in tellurium to palladium atomic ratio and 4%, by weight, of palladium was prepared in the same manner as in Example 3. 7.5 ml of catalyst so prepared was filled up in a reaction tube and kept at 335° C, and then a mixed gas of prussic acid, oxygen and nitrogen was introduced thereinto in a volume ratio of 5:6.5:152 and in space velocity of 1,300 hr$^{-1}$. The reaction results 4 hours, 8 hours and 16 hours after the reaction was started were as shown in Table 2.

Table 2

| Reaction time | Conversion of prussic acid (%) | Selectivity to dicyan (%) |
|---|---|---|
| 4 hours | 83 | 64 |
| 8 hours | 76 | 62 |
| 16 hours | 72 | 62 |

EXAMPLES 6 to 8

20 ml of silica (trade name:Nikki Silica N-608; 16 to 30 meshes) were immersed in an aqueous solution containing antimonyl potassium tartrate (2.84 milimoles) and, after evaporated to dryness, calcined in air at 500° to 600° C for 2 hours to obtain antimony oxide which was then immersed in a hydrochloric acid solution having dissolved palladium chloride dihydrate (1.6 milimole) and, after drying, reduced in a stream of hydrogen for 30 minutes while keeping at 170° C to make a catalyst. The amounts to antimony and palladium supported were 4%, by weight, and 2%, by weight, respectively, and the atomic ratio of antimony to palladium was 1.77.

Catalysts of 0.8 and 3.5 in atomic ratio of antimony to 2%, by weight, of palladium were prepared in the same manner as described above except the amount of antimony was varied. These catalysts are considered to be such that palladium is in metallic state or alloyed with antimony and the remainder of antimony is in oxide state. 20 ml of each catalyst were filled up in a reaction tube made of pyrex glass in the same manner as in Example 1 and a mixed gas of prussic acid, oxygen and nitrogen was introduced thereinto in a volume ratio of 5:6.5:152 and in space velocity of 500 hr$^{-1}$ while the reaction temperature was kept at 290° C. As a product using prussic acid as a carbon source only dicyan and carbon dioxide were obtained. The reaction results 30 minutes after the reaction started were as shown in Table 3.

Table 3

| No. | Ratio of antimony to palladium in catalyst | Conversion of prussic acid (%) | Selectivity to dicyan (%) |
|---|---|---|---|
| 6 | 0.8 | 69 | 66 |
| 7 | 1.77 | 80 | 62 |
| 8 | 3.5 | 48 | 57 |

COMPARATIVE EXAMPLE 1

20 ml (8.5g) of slica (trade name:Nikki Silica N-608; 16 to 30 meshes) were immersed in a hydrochloric acid solution containing palladium chloride (1.6 milimole) and, after drying, reduced with hydrogen in the same manner as in Example 1 to prepare a reduced palladium catalyst. The amount of palladium supported was 2%, by weight, per carrier. 20 ml of the catalyst were filled up in a reaction tube and a mixed gas of prussic acid, oxygen and nitrogen was introduced thereinto in a volume ratio of 5:6.5:152 and in space velocity of 500 $hr^{-1}$ while the reaction temperature was kept at 310° C. The reaction result 30 minutes after the reaction started was such that the conversion of prussic acid was almost zero and only below 1% of carbon dioxide and dicyan was detected.

EXAMPLE 9

20 ml of tellurium-palladium catalyst supported on silica prepared in the same manner as in Example 3, in which the atomic ratio of tellurium to palladium is 0.5 and the amount of palladium supported is 4%, by weight, were filled up in a reaction tube and a mixed gas of prussic acid, oxygen and nitrogen was introduced thereinto in a volume ratio of 1:0.21:17.3 and 1:0.94:16.6 and in space velocity of 5,500 $hr^{-1}$ while the reaction temperature was kept at 320° C. The reaction results 30 minutes after the reaction started were as shown in Table 4.

Table 4

| Volume ratio of oxygen to prussic acid | Conversion of prussic acid (%) | Selectivity to dicyan (%) |
|---|---|---|
| 0.94 | 30 | 68 |
| 0.21 | 18 | 81 |

What is claimed is:

1. A process for preparing dicyan characterized by reacting prussic acid and molecular oxygen in gaseous phase at reaction temperatures of 150° to 650° C in the presence of a solid catalyst comprising palladium and at least one of tellurium and antimony.
2. The process as set forth in claim 1 wherein the atomic ratio of antimony to palladium in said catalyst is 0.05 to 30.
3. The process as set forth in claim 1 wherein the atomic ratio of tellurium to palladium in said catalyst is 0.01 to 10.
4. The process as set forth in claim 1 wherein the amount of palladium supported on carrier in said catalyst is within the range of 0.1 to 20%, by weight.
5. The process as set forth in claim 1 wherein the reaction temperature is 200° to 400° C.
6. The process as set forth in claim 1 wherein the amount of oxygen to prussic acid is 0.5 to 6 times the stoichiometric quantity.
7. The process as set forth in claim 1 wherein an inert gas is used as a diluent in the reaction.
8. The process as set forth in claim 1 wherein said catalyst comprises
   1. at least one substance selected from the group consisting of metal and metal oxide of palladium and
   2. at least one substance selected from the group consisting of metals and metal oxide of tellurium and antimony.